United States Patent Office 2,790,006
Patented Apr. 23, 1957

2,790,006

METHOD OF PRODUCING DIMETHYL-NONANALS

Carl Bordenca, Birmingham, Ala., assignor to Newport Industries, Inc., Pensacola, Fla., a corporation of Delaware No Drawing. Application May 14, 1953,
Serial No. 355,197

5 Claims. (Cl. 260—604)

This invention relates to a method of producing 11-carbon aldehydes, and more particularly 4,8-dimethylnonanal.

It is well known that the pyrolysis of certain terpenes leads to the formation of other terpenes which occur naturally only to a small extent. For example, the pyrolysis of alpha-pinene yields allo-ocimene and alpha- and beta-pyronenes. Allo-ocimene occurs naturally in the oil from the leaves of Ocimum basilicum Linn., Ocimum gratissimum Linn. and Hamoranthus flavescens.

The pyrolysis of beta-pinene yields predominantly myrcene, which occurs naturally in a number of essential oils especially verbena oil. The formulas of myrcene, allo-ocimene, and alpha- and beta-pyronenes are represented as follows:

$(CH_3)_2-C=CH-CH_2-CH_2-C(=CH_2)-CH=CH_2$

Myrcene $(CH_3)_2-C=CH-CH=CH-C(CH_3)=CH-CH_3$

Allo-ocimene

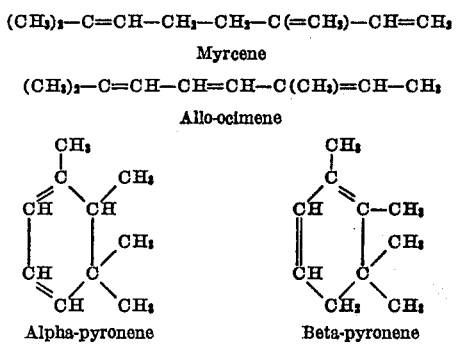

Alpha-pyronene    Beta-pyronene

I have now found that these terpene pyrolysis products serve as valuable starting materials in the production of 11-carbon aldehydes, such as 4,8-dimethylnonanal. These aldehydes can be used as such or as intermediates, or can be reduced to give the corresponding alcohol, or oxidized to give the corresponding acid. The dimethylnonanol and dimethylnonanoic acid are useful in the making of esters which, in turn, can be used in making plasticizers, lubricants and detergents.

It is therefore an important object of this invention to provide a method for making 11-carbon aldehydes and particularly 4,8-dimethylnonanal.

Other and further important objects of this invention will become apparent from the following description and appended claims.

In accordance with the method of my present invention, any of the foregoing terpene pyrolysis products, or a mixture of one or more of them is subjected to hydroformylation in order to convert these terpene hydrocarbons into the corresponding C-11 aldehydes. The hydroformylation is carried out with the use of a mixture of carbon monoxide and hydrogen, commonly referred to as "synthesis gas," under pressure and at an elevated temperature.

The following example will serve to illustrate a preferred embodiment of my invention.

*Example.—Starting with allo-ocimene*

410 parts by weight of allo-ocimene were charged into a pressure vessel having a capacity four times the volume of the charged material, along with 40 parts by weight of cobalt carbonyl crystals. A 1:1 volume mixture of carbon monoxide and hydrogen was charged in to a pressure of 4000 p. s. i. and the vessel heated with shaking to 135° C. A maximum pressure of 5500 p. s. i. was attained at that temperature, followed by pressure reduction in the course of 2 hours to 3000 p. s. i. Distillation of the reaction mass gave a 70% yield of 4,8-dimethylnonanal based upon the allo-ocimene used as starting material. A fraction analyzing 92% aldehyde boiled at 94–5° C./10 mm. Hg and had an index of refraction, $n_D^{20}$, of 1.4340 and a specific gravity, $d_4^{20}$ of 0.834. The 2,4-dinitrophenylhydrazone melted at 69–72° C.

In the hydroformylation step, the composition of the mixture of carbon monoxide and hydrogen may be varied considerably, but the 1:1 molar ratio commonly used in carrying out the Oxo reaction has been found most satisfactory. The temperature is preferably maintained at less than 200° C., with from 125 to 150° C. as the optimum range. Other temperature and pressure conditions and other catalysts than those specifically mentioned in the example can be used provided they are favorable to the formation of the corresponding aldehyde with reasonably good yield.

Myrcene can be subjected to hydroformylation under conditions similar to those given in the example to give 4,8-dimethylnonanal. A simple proof of the structure of aldehyde obtained from myrcene and allo-ocimene was afforded through comparison of the acid obtained by oxidation of the aldehyde, and 4,8-dimethylnonanoic acid of known structure obtained from citral by the following series of reactions:

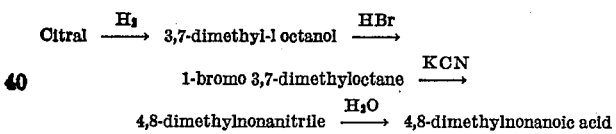

Amides and anilides of the acids were found to have similar properties. Comparison of infrared absorption spectra showed the acids to be the same.

When alpha- or beta-pyronene is used as the starting material and subjected to hydroformylation under the same conditions as given for allo-ocimene in the example, 11-carbon aldehydes are formed that correspond to tetramethyl cyclohexyl aldehydes.

I claim as my invention:

1. The method of preparing a dimethylnonanal, which comprises subjecting a terpene selected from the group consisting of allo-ocimene and myrcene in the presence of a hydroformylation catalyst to hydroformylation at an elevated temperature under 200° C. to produce 4,8-dimethylnonanal and recovering the same.

2. The method of preparing a dimethylnonanal, which comprises subjecting a terpene selected from the group consisting of allo-ocimene and myrcene to the action of carbon monoxide and hydrogen at a temperature of from 125 to 150° C. and in the presence of a cobalt hydroformylation catalyst until an aldehyde having the formula $C_{11}H_{22}O$ has been produced and recovering said aldehyde.

3. The method of preparing a dimethylnonanal, which comprises subjecting a terpene selected from the group consisting of allo-ocimene and myrcene to the action of carbon monoxide and hydrogen at a temperature of from 125 to 150° C. and in the presence of cobalt carbonyl until an aldehyde having the formula $C_{11}H_{22}O$ has been produced and recovering said aldehyde.

4. The method of preparing 4,8-dimethylnonanal, which comprises subjecting a terpene selected from the group consisting of allo-ocimene and myrcene to the action of carbon monoxide and hydrogen in substantially a 1:1 ratio, under pressure and at an elevated temperature under 200° C. in the presence of a cobalt hydroformylation catalyst until the starting terpene has been substantially converted into 4,8-dimethylnonanal and recovering the latter.

5. In the process of making 4,8-dimethylnonanal, the step which comprises subjecting a terpene selected from the group consisting of myrcene and allo-ocimene to the action of carbon monoxide and hydrogen at an elevated temperature under 200° C. in the presence of cobalt carbonyl under pressure and temperature conditions favorable to hydroformylation to produce 4,8-dimethylnonanal.

References Cited in the file of this patent

UNITED STATES PATENTS

| | | |
|---|---|---|
| 2,437,600 | Gresham | Mar. 9, 1948 |
| 2,462,448 | Whitman | Feb. 22, 1949 |
| 2,686,206 | Cerveny | Aug. 10, 1954 |
| 2,688,591 | Hill | Sept. 7, 1954 |
| 2,701,816 | Buchner et al. | Feb. 8, 1955 |

FOREIGN PATENTS

| | | |
|---|---|---|
| 493,493 | Belgium | Feb. 15, 1950 |

OTHER REFERENCES

Groggins: Unit Processes in Organic Synthesis, pp. 560 and 561, McGraw-Hill Book Co., Inc., N. Y., 1952.